United States Patent [19]
Shibata et al.

[11] 3,866,833
[45] Feb. 18, 1975

[54] IRRIGATION HOSE
[75] Inventors: Osamu Shibata, Suita; Susumu Kojimoto, Ibaragi; Takeshi Okuno, Takatsuki, all of Japan
[73] Assignee: Sumitomo Chemical Company, Limited, Osaka, Japan
[22] Filed: Sept. 17, 1973
[21] Appl. No.: 397,727

[30] Foreign Application Priority Data
Sept. 20, 1972 Japan.............................. 47-94886

[52] U.S. Cl.................. 239/76, 239/404, 239/450, 239/547
[51] Int. Cl............................................. B05b 1/20
[58] Field of Search ............ 239/76, 269, 450, 542, 239/547, 398, 404

[56] References Cited
UNITED STATES PATENTS
| | | | |
|---|---|---|---|
| 2,730,404 | 1/1956 | Meisinger et al. ................ | 239/269 |
| 3,567,134 | 3/1971 | Smith................................ | 239/547 |
| 3,672,571 | 6/1972 | Goodricke ...................... | 239/269 X |
| 3,698,195 | 10/1972 | Chapin............................ | 239/542 X |

*Primary Examiner*—M. Henson Wood, Jr.
*Assistant Examiner*—John J. Love
*Attorney, Agent, or Firm*—Stevens, Davis, Miller & Mosher

[57] ABSTRACT

An irrigation hose for agriculture comprises a plastic pipe having a plurality of flow paths each partitioned independently by diaphragm and extending longitudinally. That portion of an outer wall of the plastic pipe which defines at least one of the flow paths is formed with small bores properly spaced for sprinkler use along its length. Said at least one of the flow paths serves as a constant pressure path while at least one of other flow paths which are separated from the constant pressure path by the diaphragm serves as a supply path. Small bores communicating both the constant pressure path and the supply path are formed in the diaphragm separating the both paths along its length. In a modification of the present invention, the diaphragm is helically formed. The irrigation hose of the present invention is characterized by a constant amount of water sprinkled irrespective of the distance from a water supply.

2 Claims, 5 Drawing Figures

IRRIGATION HOSE

The present invention relates to an irrigation hose for agriculture. More particularly, it relates to an irrigation hose for agriculture wherein the amount of water sprinkled is kept constant irrespective of the distance from a water supply.

As a part of recent activities in rationalizing agricultural works, a tendency of systematically effecting irrigation, fertilization, etc., has become more common. These methods include sprinkler systems, drip systems or the like.

In the drip system, an irrigation hose having small bores preformed along its length is installed in close proximity to plants and water from a supply is sprinkled through the small bores with the aid of a pump or water pressure. So long as a simple tubular pipe is used as the hose, the water pressure varies substantially depending upon the distance from the water supply, resulting in too much water being sprinkled near the water supply but too little water far from the supply. Accordingly, such a type of hose has not been utilized as an essentially long, multi-purpose irrigation hose. Thus, as an improvement over the above drip system, a two-tube irrigation hose has been devised. The two-tube irrigation hose includes two pipes of different diameter, a pipe of smaller diameter being fitted into a pipe of larger diameter over its entire length. An outer wall of the pipe of larger diameter is formed with small bores along its length at an appropriate interval for sprinkling and an outer wall of the pipe of smaller diameter is also formed with small bores along its length. Water from the supply is fed through the smaller pipe, and hence delivered through the small bores in the outer wall of the smaller pipe and sprinkled out of the small bores formed in the outer wall of the larger pipe. Thus, by properly selecting the locations of the small bores formed in the outer wall of the smaller diamter pipe and the spacing therebetween the larger diameter pipe can provide a constant pressure path so that the amount of water sprinkled may be kept constant irrespective of the distance from the supply.

The two-tube irrigation hose of this type, however, includes defects in that the outer tube design has to be of unduly large diameter, and the hose is troublesome in handling and very expensive. That is, since two tubes are required in this system, the outer tube may cost twice or more the cost of the inner tube. In addition, it is very troublesome and time consuming and hence very expensive to insert the pipe of smaller diameter into the pipe of larger diameter over its entire length, particularly when the pipes are long. Furthermore, care must be always taken to prevent the smaller pipe from drawing off when the hose is transported with the inner pipe being inserted in the outer pipe. This as well as the fact of large diameter of the hose substantially decrease the efficiency of installation work.

It is, therefore, an object of the present invention to provide a compact and inexpensive irrigation hose wherein the amount of water sprinkled is kept constant irrespective of the distance from the supply.

In accordance with the present invention, an irrigation hose for agriculture is provided which comprises a plastic pipe having a plurality of flow paths each partitioned independently by diaphragms and extending longitudinally. That portion of an outer wall of the plastic pipe which defines at least one of the flow paths is formed with small bores properly spaced for sprinkler use along its length. Said at least one of the flow paths serves as a constant pressure path while at least one of other flow paths which are separated from the constant pressure path by the diaphragm serves as a supply path. Small bores communicating both the constant pressure path and the supply path are formed in the diaphragm separating the both paths along its length.

A preferred embodiment of the present invention which comprises a plastic pipe having a single diaphragm for use as an irrigation hose will now be described with reference to the accompanying drawings, although the present invention is not limited to the particular embodiment disclosed.

Figure 1:
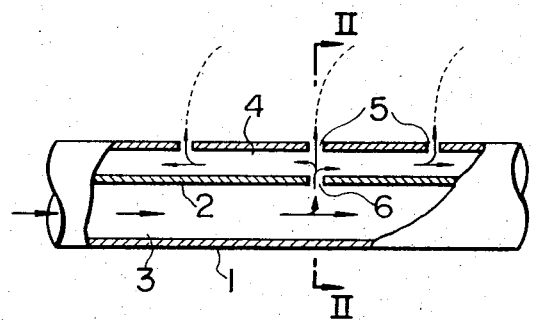
FIG. 1 is a side view, partly in section, of a preferred embodiment of the present invention.
Figure 2:
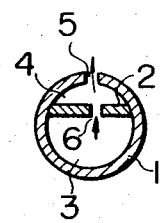
FIG. 2 is a cross-sectional view taken on a line II—II in FIG. 1.

Referring to FIGS. 1 and 2, the hose comprises a pipe outer wall 1, a diaphragm 2, a supply path 3 and a constant pressure path 4. Small bores 5 for sprinkling are formed in the pipe outer wall 1 on the side of the constant pressure path 4 at an interval appropriate for irrigation, and small bores 6 which communicate the supply path 3 with the constant pressure path 4 are formed in the diaphragm 2. In accomplishing a uniform amount of water irrigation from the small bores 5, the selection of the spacing of the small bores 6 in the diaphragm 2 is relatively critical. As an example, where the spacing of the small bores 5 for sprinkling is 40 cm it is generally preferable to select the spacing of the small bores 6 in the diaphragm to 160–200 cm, the optimum value being easily determined through a trial and error process.

The plastic pipe with such a diaphragm may be formed in any suitable method. For example, it may be integrally formed in an inexpensive, continuous process as easily as the formation of a simple plastic pipe, by attaching a pipe die having a slit for the diaphragm to an extremity of an extruder.

Drilling of the small bores may also be performed without difficulty, preferably by an electrical drill. By deeply inserting the drill at a rate of once for several times of drilling for the sprinkling bores 5, the diaphragm bores 6 may be simultaneously formed.

Figure 3:
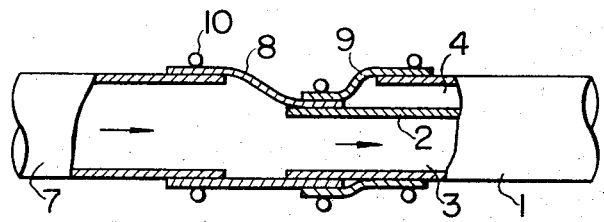
FIG. 3 illustrates the connection of the hose in accordance with the present invention.

The connection of the irrigation hose in accordance with the present invention with a water path from the supply is also effected with ease. Referring to FIG. 3 which illustrates an example, a portion of the pipe outer wall 1 on the side of the constant pressure path 4 at one end of the plastic pipe having the diaphragm is eliminated, and then an outer wall 7 of the water path from the supply and the outer walls 1 and 2 of the supply path 3 are connected together through a tube 8 of thick plastic film. On the other hand, in order to prevent water from leaking out of the constant pressure path 4, an entire outer wall 1 of the pipe and the outer walls 1 and 2 of the supply path 3 are sealed by a tube 9 of a thick plastic film and the assembly is clamped by wires 10. As a modification of the connection, an end of the constant pressure path may be plugged and the entire pipe assembly thus formed may be connected as the water path from the supply.

In accordance with the present invention, the water in the supply path 3 fed through the water path from the supply passes through the small bores 6 in the diaphragm and kept at a constant pressure in the constant pressure path 4 and then sprinkled out of the small bores 5 with the amount of water sprinkled being kept uniform irrespective of the distance from the supply.

It should be understood that the irrigation hose in accordance with the present invention is not only usable for irrigation purpose but also finds its use in various applications such as fertilization, prevention, extermination or the like. When applied in these fields, liquid fertilizer or liquid chemical is diluted with water and then passed through the hose.

Although the irrigation hose of the present invention has been shown and described hereinabove in connection with the pipe with diaphragm comprising two paths, the pipe with diaphragm including three or more paths may be applicable for special purpose and those modifications should be within the scope of the present invention.

Figure 4:
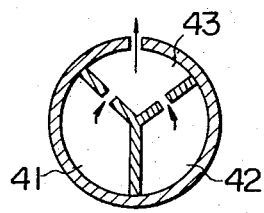
FIGS. 4 and 5 are cross-sectional views showing other embodiments of the present invention.
Figure 5:
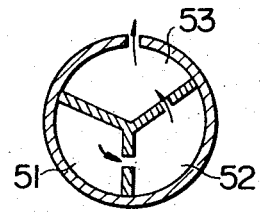

Referring to FIGS. 4 and 5, the modifications of the irrigation hose of the present invention which comprise three paths will now be described.

The hose illustrated in FIG. 4 includes two independent supply paths 41, 42 and a constant pressure path 43 wherein different kind of liquids are passed through the supply paths 41, 42 respectively and they are joined and mixed together in the constant pressure path 43 in order to be sprinkled.

The hose illustrated in FIG. 5 comprises a supply path 51, a first constant pressure path 52 and a second constant pressure path 53. This modification is suitable to be installed at a location where a uniform amount of water sprinkled is hard to accomplish, such as in an inclined field. Thus, water from the supply path 51 is first kept at a relatively uniform pressure by the first constant pressure path 52 and then regulated to a more uniform pressure by the second constant pressure path 53 before it is sprinkled.

When the diaphragms of the hose of the present invention is helically formed, it presents remarkable advantages as an irrigation hose. First, the liquids in the supply paths and the constant pressure paths are stirred while they are transported under pressure, thus eliminating the need of stirring apparatus even when the hose is used for fertilization, prevention or extermination. Second, compression strength against a stress from a side of the pipe remarkably increases as compared with a pipe of simple construction and even with a pipe with a parallel diaphragm. The hose is generally handled roughly in these fields and frequently trampled under feet or tires of vehicles, as a result of which the hose is broken or other trouble occurs frequently. It has been recognized by the present inventors that the strength of the pipe with a helical diaphragm was improved by the factor of 4 to 10 times as compared with the conventional pipe. This is a noticeable advantage.

The plastic pipe with such a helical diaphragm may be formed in an inexpensive, continuous process as easily as the formation of a simple plastic pipe or pipe with parallel diaphragm, by rotatably attaching a pipe die having a slit for the diaphragm to an extremity of an extruder and extruding molten plastics while rotating the die, although the present invention is not limited to this particular process.

As plastics used for the production of the irrigation hose of the present invention, not only polyethylene, polyvinylchloride and the like but also other moldable plastics can be used.

The plastics used in the present invention may include foaming agent and/or reinforcing agent as additive.

What is claimed is:

1. An irrigation hose for agriculture comprising a plastic pipe having a plurality of flow paths each partitioned independently by diaphragms helically formed and extending longitudinally, that portion of an outer wall of the plastic pipe which defines at least one of the flow paths being formed with small bores properly spaced for sprinkler use along its length, and serving as a constant pressure path while at least one of the other flow paths, separated from the constant pressure path by the diaphragm, serves as a supply path, and small bores communicating both the constant pressure path and the supply path formed in the diaphragm separating the both paths along its length.

2. An irrigation hose for agriculture comprising a plastic pipe having a plurality of flow paths each partitioned independently by longitudinally extending diaphragms, that portion of an outer wall of the plastic pipe which defines at least one of the flow paths being formed with small bores properly spaced for sprinkler use along its length and serving as a constant pressure path while two of the other flow paths which are separated from the constant pressure path by the diaphragm, serve as supply paths, small bores communicating both the supply paths to the constant pressure path so that different kinds of liquids can be passed independently each through the supply paths and joined and mixed together in the constant pressure path.

* * * * *